UNITED STATES PATENT OFFICE.

JOSHUA HOILES, OF MOUNT UNION, ASSIGNOR OF ONE-HALF TO GILBERT M. BROWN, OF ALLIANCE, OHIO.

CALCIMINING-CEMENT.

SPECIFICATION forming part of Letters Patent No. 239,499, dated March 29, 1881.

Application filed February 23, 1881. (No specimens.)

*To all whom it may concern:*

Be it known that I, JOSHUA HOILES, a citizen of the United States, residing at Mount Union, in the county of Stark and State of Ohio, have invented a new and useful Composition of Matter for the Formation of an Improved Calcimining-Cement, of which the following is a specification.

My composition consists of the following ingredients, combined in about the proportions stated, viz: unslaked lime, six pounds; marble-dust, one and one-half pound; potters' clay, one and one-half pound; water of sufficient quantity to mix in the proper consistency. The said composition may be blued with ultramarine-blue, to suit the color of ceiling or wall and the taste of the operator. These ingredients are to be thoroughly mixed by agitation.

The object of the above composition is to form a hard and smooth surface on the walls of houses.

What I claim, and desire to secure by Letters Patent of the United States, is—

The herein-described composition of matter for the formation of a calcimining-cement, consisting of unslaked lime, marble-dust, potters' clay, and water, in about the proportions specified.

JOSHUA HOILES.

Witnesses:
WALTER BRAY,
S. V. ESSICK.